United States Patent
Jha et al.

(10) Patent No.: US 11,650,116 B2
(45) Date of Patent: May 16, 2023

(54) CONTAINER LASHING GEAR MONITORING SYSTEM

(71) Applicant: Alpha Ori Technologies Pte. Ltd, Singapore (SG)

(72) Inventors: Somesh Jha, San Diego, CA (US); Piyush Raj, Singapore (SG)

(73) Assignee: Alpha Ori Technologies Pte. Ltd., Singapore (SG)

( * ) Notice: Subject to any disclaimer, the term of this patent is extended or adjusted under 35 U.S.C. 154(b) by 162 days.

(21) Appl. No.: 16/776,080

(22) Filed: Jan. 29, 2020

(65) Prior Publication Data

US 2020/0264061 A1 Aug. 20, 2020

Related U.S. Application Data

(60) Provisional application No. 62/798,331, filed on Jan. 29, 2019.

(51) Int. Cl.
*G01L 5/105* (2020.01)
*G01L 1/24* (2006.01)

(52) U.S. Cl.
CPC .............. *G01L 5/105* (2013.01); *G01L 1/246* (2013.01)

(58) Field of Classification Search
CPC ......... G01L 5/105; G01L 1/246; B60N 2/002; B60R 21/01516
USPC ........................................................ 73/800
See application file for complete search history.

(56) References Cited

U.S. PATENT DOCUMENTS

| | | | |
|---|---|---|---|
| 6,543,296 B1 | 4/2003 | Bermudez | |
| 8,314,925 B2 * | 11/2012 | Rubbiero | G01L 5/0009 356/35 |
| 11,180,070 B1 * | 11/2021 | Rainone | G01L 5/04 |
| 2003/0074978 A1 * | 4/2003 | Bermudez | G01L 5/103 73/828 |
| 2018/0229809 A1 | 8/2018 | Stefanoff et al. | |
| 2018/0319312 A1 * | 11/2018 | Cooper | G01L 5/101 |

FOREIGN PATENT DOCUMENTS

| | | | |
|---|---|---|---|
| EP | 102013006486 | * | 9/2014 |
| GB | 2027542 | * | 2/1980 |
| JP | 2015175789 | * | 10/2015 |
| WO | 2005075286 A1 | | 8/2005 |

OTHER PUBLICATIONS

The International Preliminary Report on Patentability, dated May 12, 2021, in the related PCT Appl. No. PCT/IB2020/000075.

* cited by examiner

*Primary Examiner* — Octavia Davis Hollington (57) ABSTRACT

A system and method for monitoring one or more objects that have been restrainedly secured to a vehicle by one or more restraint members. The system includes a plurality of sensors each configured for monitoring one or more of a compressive or tensile stress or strain in one of the one or more restraint members, and a controller for periodically interrogating each of the plurality of sensors to ascertain a value of stress or strain detected by the respective sensor. When a change in the value of stress or strain is indicative of loosened or overtightened restraint members, a mitigation event is triggered.

15 Claims, 12 Drawing Sheets

CONTAINER LASHING GEAR MONITORING SYSTEM

FIELD OF THE INVENTION

This disclosure relates generally to monitoring systems for restraints, and more particularly, to a tension monitoring system for lashing gear applied to containers on container vessels.

BACKGROUND

Figure 1:
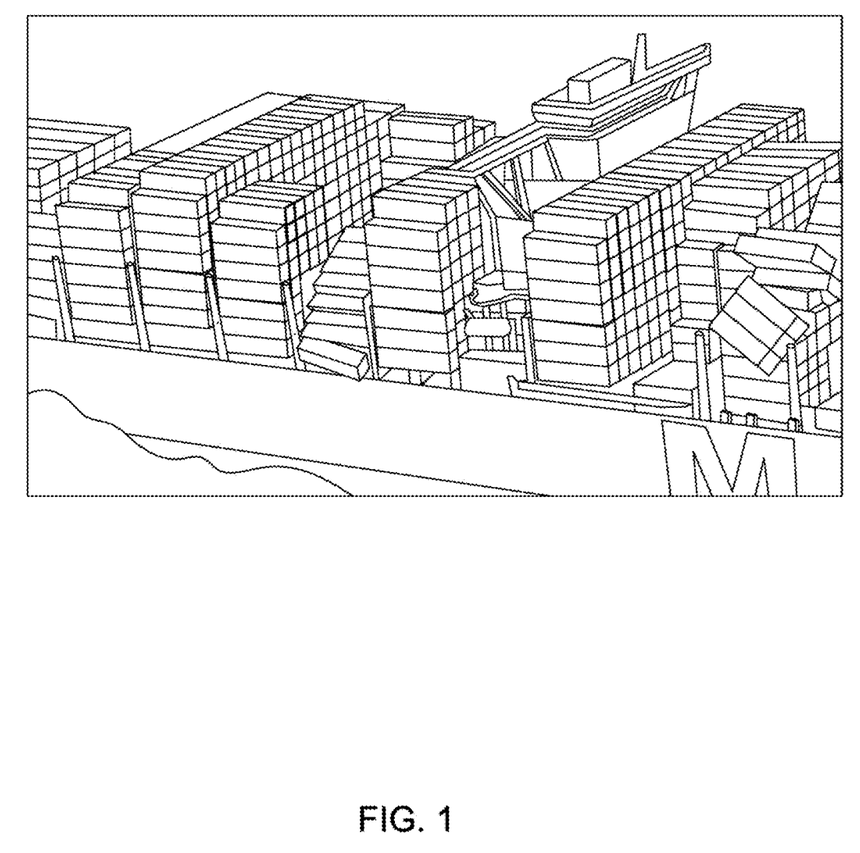
FIG. 1 illustrates the impact improperly secured containers may exert on a container vessel.

A statement given by the World Shipping Council[1] indicates that, during a survey period between 2014 and 2016, there were 612 containers lost at sea each year, excluding catastrophic loss. These losses happened despite routine checking of tension by the crews during the journies, and are most oftem are attributed to improper tensioning of lashing gear. Even in the cases where other causal factors are identified, the final component impacted before failure is the lashing gear. FIG. 1 shows a container vessel that has experienced container movement (and likely losses) as a result of improperly-tensioned lashing gear.

[1] See http://www.worldshipping.org/.

It is difficult to monitor container lashing tightness when the vessel is sailing. Containers can get loose for several reasons, including routine flexing of ship structure, bad weather, poor workmanship in loading and securing containers on borard. Normally, a container ship has several thousand containers stacked on top of each other multi-row configuration. This configuration makes container monitoring difficult. At present, the only effective way to monitor containers is by manually checking them at certain intervals during the sailing voyage period.

Manual systems for monitoring and maintaining lashing gear tension suffer several disadvantages. As the size of container ships increase over time, manual checking of tension during voyage becomes more costly, and is often not comprehensive and ineffective due to resource limitations. With increase in size of ships, it is not possible to visit each lashing rod with sufficient frequency to check its tightness. Even on a sampled basis, one estimate for example suggests manual checking require 2-3 hours time by two crew per day. Manual checking is also dangerous, with associated risks of crew falling overboard. One insurer estimates historical losses per lost container at between $100,000 to $1 million. Container losses may also generate an environmental impact with attendant costs (for example, from lost containers that are washed ashore).

Indirect methods of monitoring container security such as measuring the hull deformation and container deformation have been proposed in past. They do not directly measure the lashing rod tightness, and hence do not address the problem effectively.

It would be beneficial to develop a more effective and efficient system and method for monitoring and maintaining lashing gear tension.

SUMMARY

By way of example, aspects of the present disclosure are directed to disclose a novel system and method for remotely monitoring the lashing gear strain for containers being carried onboard ships ("SMARTLashing") using fiber optic sensors and other associated hardware and software systems.

In accordance with aspects of the present disclosure, a system and method are disclosed for monitoring one or more objects that have been restrainedly secured to a vehicle by one or more restraint members. The system includes a plurality of sensors each configured for monitoring one or more of a compressive or tensile stress or strain in one of the one or more restraint members, and a controller for periodically interrogating each of the plurality of sensors to ascertain a value of stress or strain detected by the respective sensor. When a change in the value of stress or strain is indicative of loosened or overtightened restraint members, a mitigation event is triggered The stress or strain analysis distinguishes intermittent changes indicating a vehicle movement from sustained, gradual changes indicating a restraint member that has either been loosened or overtightened.

In accordance with an additional aspect of the disclosure, the vehicle is a container ship, the objects are containers, and the restraint members include lashing gear for securing the containers.

For a typical container ship carrying 1000 or more containers, in comparison to prior art methods requiring manual monitoring of container restraints, it is estimated that the system and method disclosed herein can reduce crew effort by 2-3 hrs. by 2 crew per day, prevent crew from falling overboard (FIG. 1), and significantly reduce cost of associated insurance claims for injury and loss, which are estimated between $100 k-$1 million per container loss. In addition, the impact on environment stemming from containers washed ashore can be substantially reduced.

This SUMMARY is provided to briefly identify some aspects of the present disclosure that are further described below in the DESCRIPTION. This SUMMARY is not intended to identify key or essential features of the present disclosure nor is it intended to limit the scope of any claims.

BRIEF DESCRIPTION OF THE DRAWING

A more complete understanding of the present disclosure may be realized by reference to the accompanying drawing in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale.

Aspects of the present disclosure are directed to an inventive system and method for monitoring and maintaining lashing gear tension of a container vessel. Elements of the inventive system include lashing rods, optical strain sensors (preferably, "fiber Bragg grating" or "FBG" sensors), an interrogator unit for polling the optical strain sensors to obtain strain data, optical fiber cables for optical communications between the interrogator unit and strain sensors, and a general-purpose computer and monitor for operating the system.

Some other non-optical strain monitoring solutions require extensive power cable networks on board ship, and are difficult to implement. Also, the environment on deck is often harsh, and components are required to be environmentally robust and explosion-proof. This makes many other possible strain monitoring solutions impractical to implement on board merchant vessels.

Figure 10:
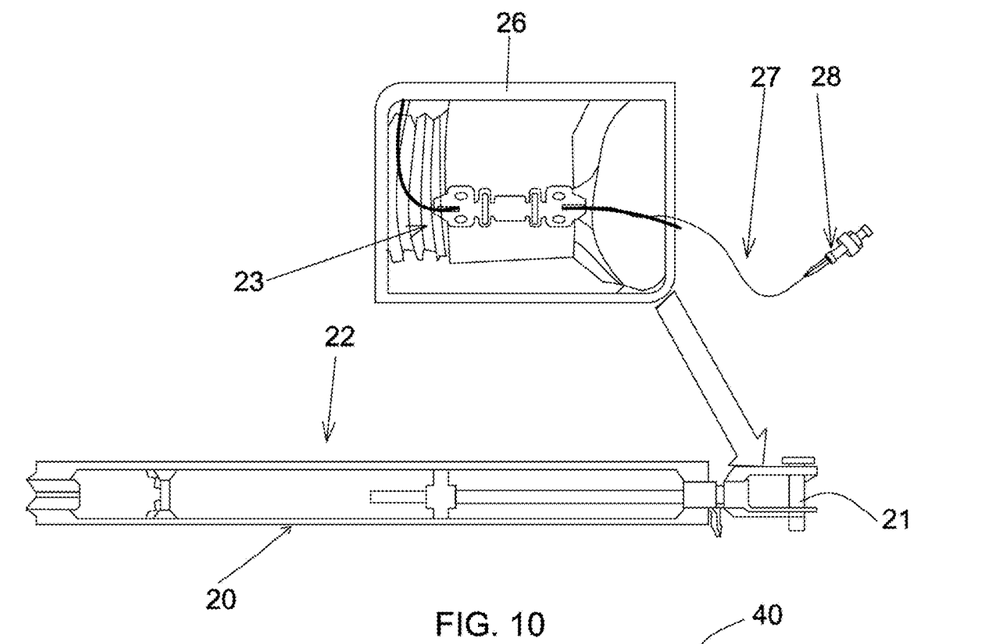
FIG. 10 further illustrates a positioning of a strain sensors on lashing rod in accordance with aspects of the present disclosure.

FIGS. 2A-4C illustrate container lashing arrangements in accordance with aspects of the present disclosure. As shown for example in FIG. 3A, containers 13 are arranged in column stacks 16 in which vertically adjacent ones of the containers 13 are fixedly fastened to one another. Column stacks 16 are subjected to a variety of forces (for example, resulting from wind and motion of the vessel 10 asea that can be characterized as one or more of pitch motion, heave motion and roll motion) which further require that the column stacks 16 be secured to the deck 18 of the vessel 10. This is typically accomplished by mechanically fastening one or more containers in the column stack to the deck 18 by means of lashing rods 20 that are preferably fastened at one end to a receptacle affixed to a container 13 and at the other end to a lashing bridge 11 that is integral with and/or affixed to the deck 18 (see, e.g., FIGS. 2A and 2B). With reference to FIG. 10, lashing rods 20 may preferably include a turnbuckle 22 with a threaded rod connected to a shackle 21 on one end, and a rod extending from the other end that terminates in a second shackle 21. The turnbuckle 22 provides a mechanism for loosening or tightening the lashing rods 20 in order to properly secure the associated containers 13 to the deck 18. In accordance with aspects of the present disclosure, and as depicted in FIG. 3C, suitable lashing gear may included a model ST-4508 knob/jaw turnbuckle and LB-44 lashing bar, both available from International Lashing Systems NV of Antwerp, Belgium.

Figure 2A:
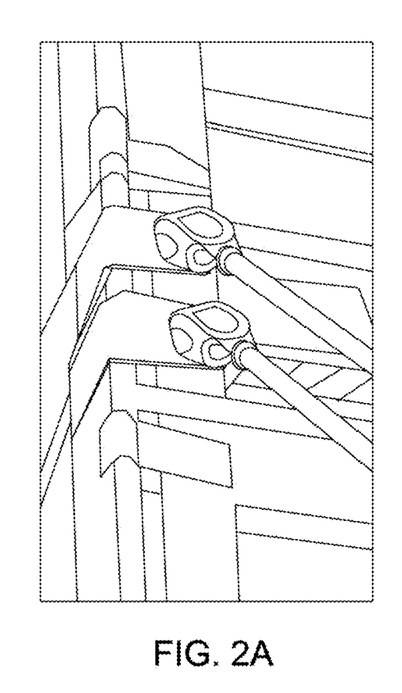
FIG. 2A illustrates typical upper lashing points on containers for container lashing rod configurations in accordance with aspects of the present disclosure.
Figures 2B, 2D:
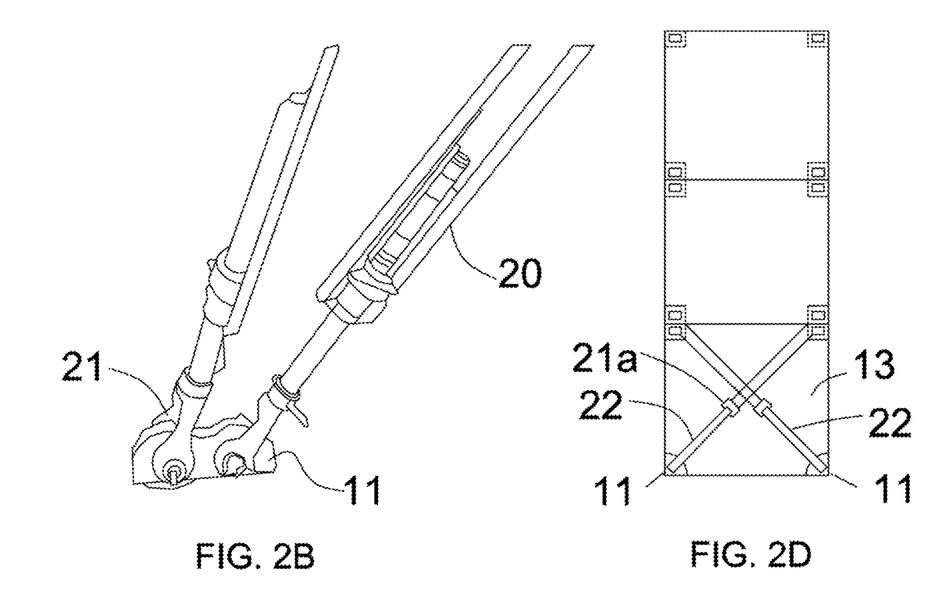
FIG. 2B illustrates typical lower lashing points on deck-mounted lashing bridges for container lashing rod configurations in accordance with aspects of the present disclosure.
FIG. 2D illustrates a first container lashing rod configuration for a container stack, in which the upper lashing points are provided near top edges of a lower container positioned below middle and upper containers.
Figure 2C:
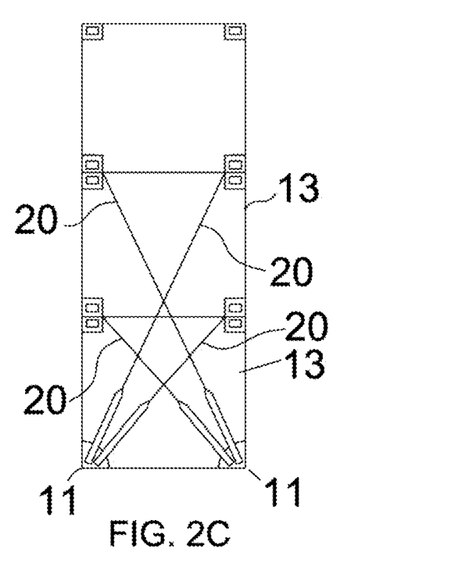
FIG. 2C illustrates a first container lashing rod configuration for a container stack, in which the upper lashing points are provided near top edges of a middle container positioned between lower and upper containers.
Figure 3A:
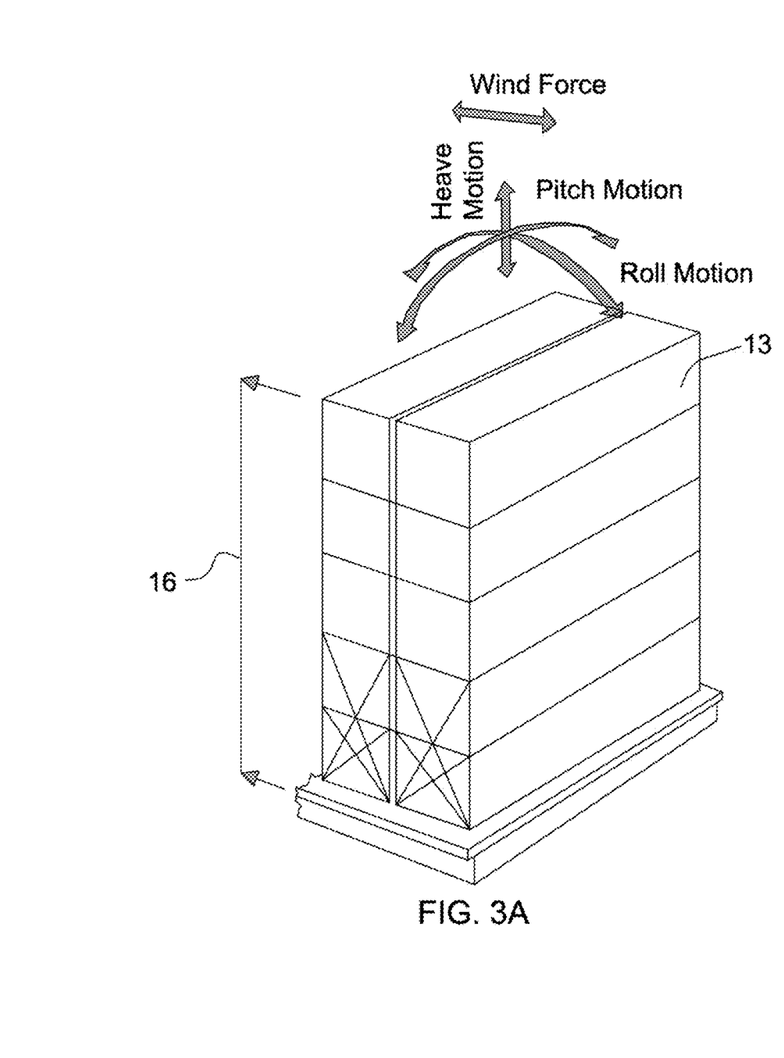
FIG. 3A further illustrates force and/or movement types typically experienced by container stacks secured on an ocean-going vessel, in accordance with aspects of the present disclosure.
Figures 3B, 3C:
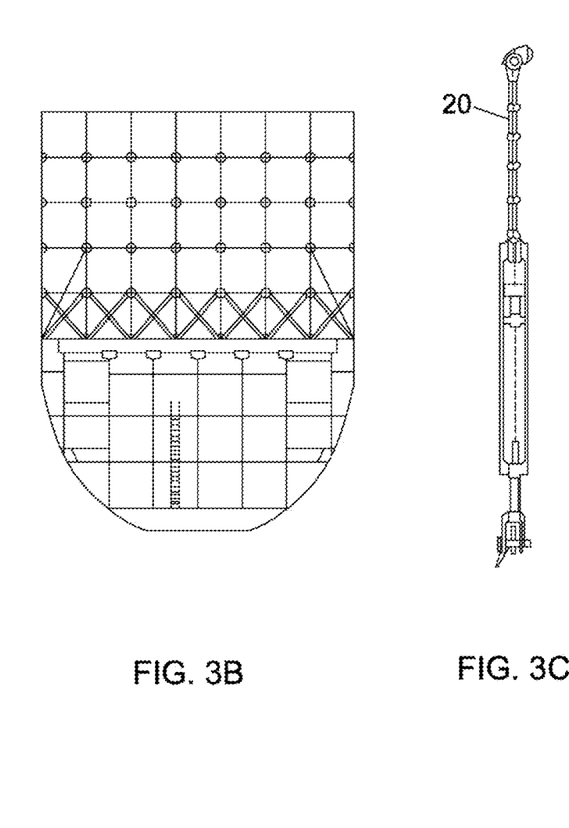
FIG. 3B illustrates a third lashing rod configuration in accordance with aspects of the present disclosure, with lashing rods selectively secured both to bottom level and second level containers in the container stacks.
FIG. 3C illustrates a typical container lashing rod.

Lashing rods 20 are preferably applied in a selective manner to a limited number of containers 13 to secure the containers 13 to the deck 18. FIGS. 2C and 2D illustrate two non-limiting examples of such selective applications. In FIG. 2D, two crossing lashing rods 13 are attached to opposing lashing bridges 11 in proximity to a lower containers 13. The turnbuckles 22 are each coupled to a twin rod and shackle arrangement that is respectively coupled to one receptacle that is integral with an upper corner of the lower container 13 and to another shackle arrangement that is coupled to a second receptacle that is integral with a lower corner of a vertically adjacent container 13 (see, eg., FIG. 2A). An equalizing device (for example, toggle plate 21a) is preferably positioned between the turnbuckles 22 and twin rod and shackle arrangement to equalize the forces applied by each lashing rod 20 to the corners of the two containers. In the example of FIG. 2C, two lashing rods 20 are paired and attached to each of the opposing lashing bridges 11, with one lashing rod of each lashing rod pair being coupled to a receptacle that is integral with an upper corner of the lower container 13 and the other rod being coupled to a another receptacle that is integral with an upper corner of a vertically adjacent container 13, providing a configuration with upper and lower crossed lashing rods.

Figure 4A:
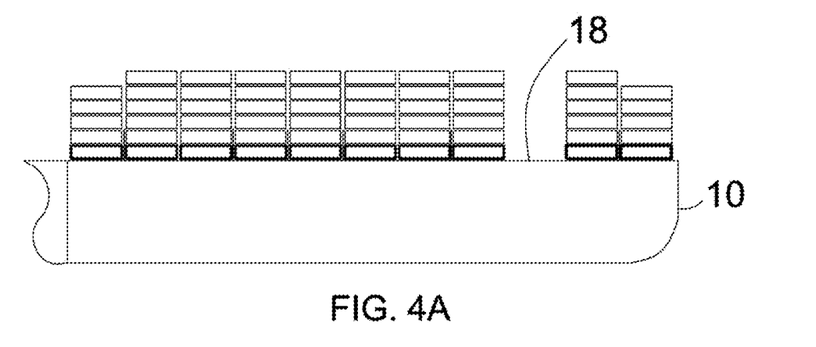
FIG. 4A provides a side schematic vies of a container vessel having a container layout in accordance with aspects of the present disclosure.
Figure 4B:
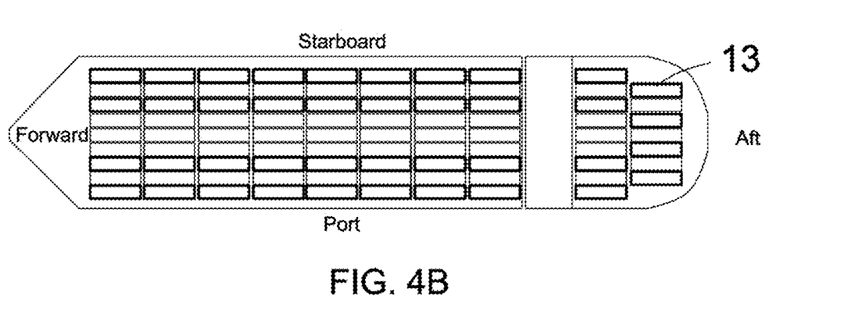
FIG. 4B provides a top schematic view of the container vessel of FIG. 4A.
Figure 4C:
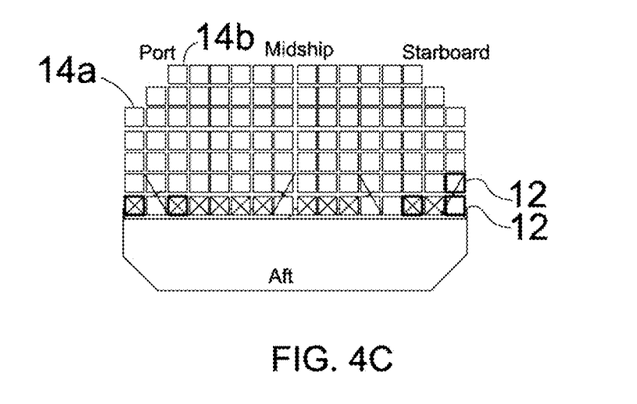
FIG. 4C provides a rear schematic view of the container vessel of FIG. 4A.

FIGS. 4A-4C illustrate a lashing rod monitoring scheme in accordance with aspects of the present invention. A typical container vessel 10 may carry several thousand containers. As illustrated, for example, in FIG. 4A, these containers sit on top of each other in self-locking sockets. Several containers stacked in this way behavelike a column. Lashing rods are fitted to deck-mounted lashing bridges as well as containers positioned at first or second tier levels in the columns. At sea, the bottom-most tiers are subjected to the highest stresses, and therefore most suitable to receive lashing. A suitable monitoring scheme should ideally be capable of ensuring that lashing tightness of all containers is comprehensively covered without having the need to fit all lashing rods with sensors. For this purpose, the inventors determined by experimentation and by studying causal factors for container lashing becoming loose or tight that sensors could be applied to lashing rods associated with just two rings of the most vulnerable container stacks. As illustrated for example in FIGS. 4A-4C by the countainers outlined in bold, these rings include containers 13 occupying one or two tiers 12 of the outermost stack rows 14a on the deck 18 of the container vessel 10, and at least one tier of the outermost stack rows 14b having a highest stack weight. FIG. 4C for example illustrates an example lashing rod configuration at the rear (aft) position of the container field that includes lashings applied to the endpoints of these rings. As illustrated, other containers deemed to be especially vulnerable may optionally be added for monitroring as well.

Figure 5A:
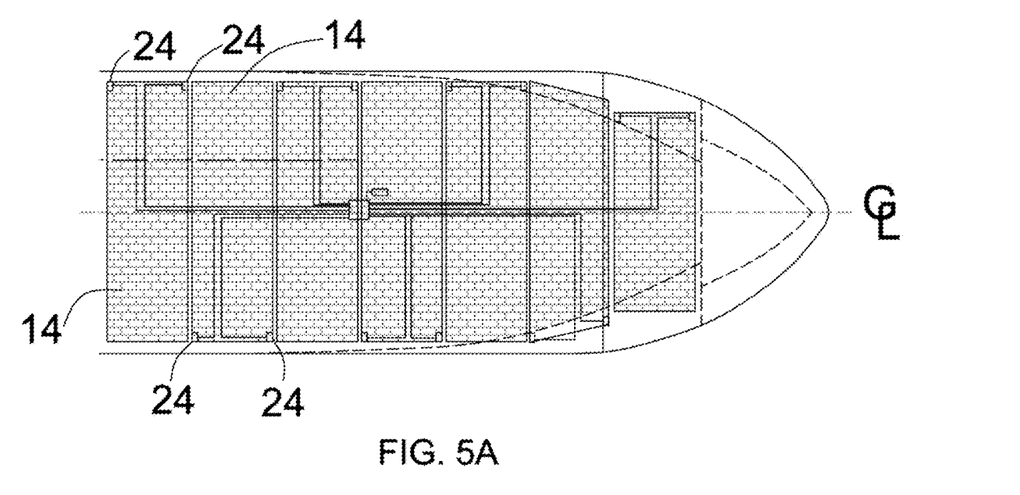
FIG. 5A illustrates a first array of strain sensors within a container field according to aspects of the present disclosure.
Figure 5B:
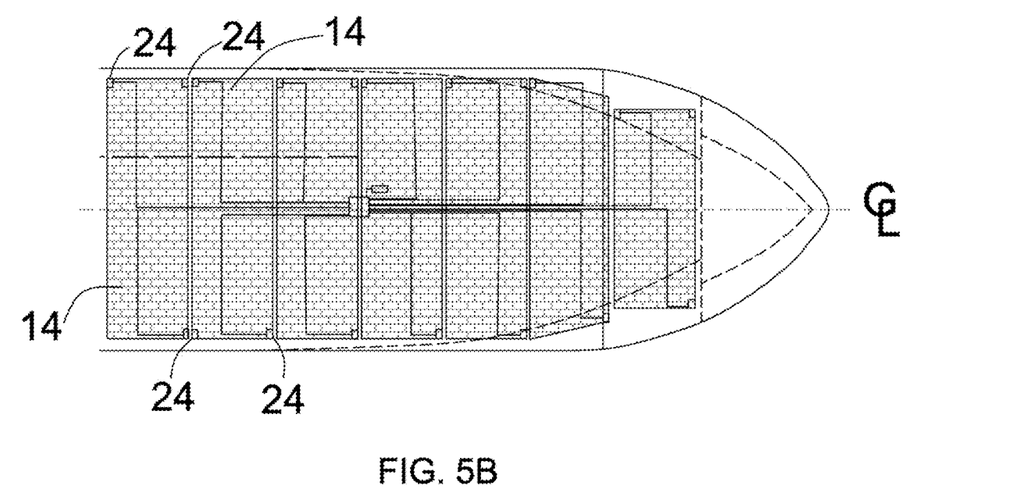
FIG. 5B illustrates a second array of strain sensors within a container field according to aspects of the present disclosure.

The inventors further determined that the number of sensors 24 used in each ring can be selectively reduced without significantly impacting the ability of the system to detect tensioning anomalies for the lashing rods 20. Specifically, for example, as illustrated by FIG. 5A, sensors 24 can alternatively be omitted on each of port and starboard sides from adjacent bays 14, such that each bay 14 has sensors 24 positioned on only one of the sides (port or starboard) of the bay. As another example illustrated by FIG. 5B, the sumber of sensors on port and starboard sides in each bay can be reduced (for example, eliminating sensors on either the for or aft lashing rods 20 on each side).

Figure 8A:
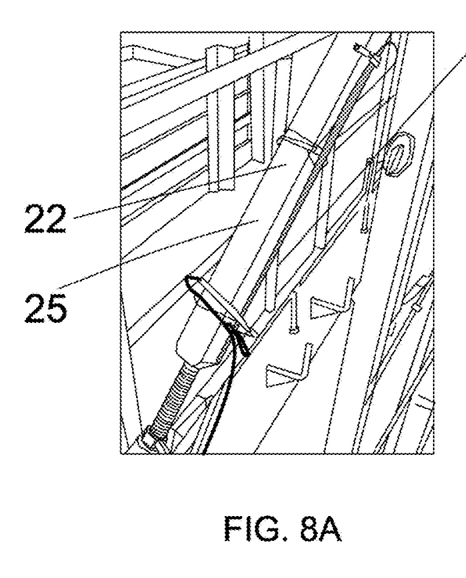
FIG. 8A illustrates a first placement of strain sensors in accordance with aspects of the present disclosure.
Figure 8B:
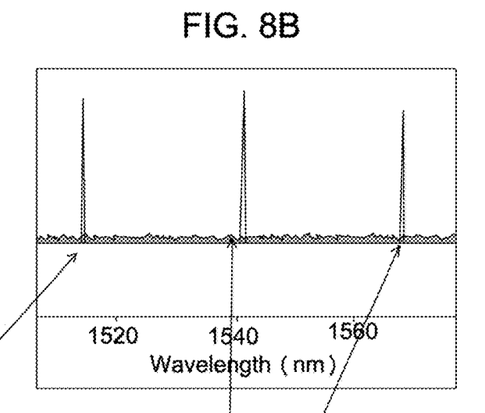
FIG. 8B illustrates wavelength characteristics of strain sensor applied to the placements illustrated in FIGS. 8A and 8C.

FIGS. 8A-8C and FIG. 10, in accordance with aspects of the present disclosure, illustrates sensor configurations as applied to the lashing rods 20. As depicted, strain gauges are applied along a longitidinal axis of the lashing rods 20. The sensors 25, 26 depicted in FIGS. 8A-8C and FIG. 10 are optical strain gauges (a suitable gauge for this purpose is the OS3100 optical strain gauge available from Micron Optics, Inc. of Atlanta, Ga.). The OS3100 optical strain gauge incorporates a fiber Bragg grating (FBG) configured as a fiber Fabry-Perot interferometer. The FBGs enable strain to be indicated as a function of the wavelength of incident light. FIG. 8A illustrates a first configuration, in which a long strain-sensing gauge 25 is affixed to the turnbuckle 22 of the lashing rod 20. FIG. 8 C and FIG. 10 illustrate a second configuration, in which a short strain-sensing gauge is affixed to the shackle 21 of the lashing rod 20. Strain is measured by sending a laser beam through the FBG sensor fitted on the lashing gear, and measuring the change in wavelength. For ease of identification, ach sensor is assigned a unique wavelength. This approach minimizes the amout of required cabling, and supports a modular, scalable infrastructure which is practical and easy to implement.

Figure 8C:
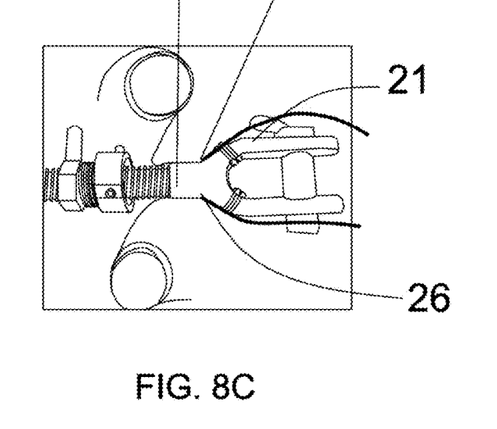
FIG. 8C illustrates a second placement of strain sensors in accordance with aspects of the present disclosure.
Figure 9A:
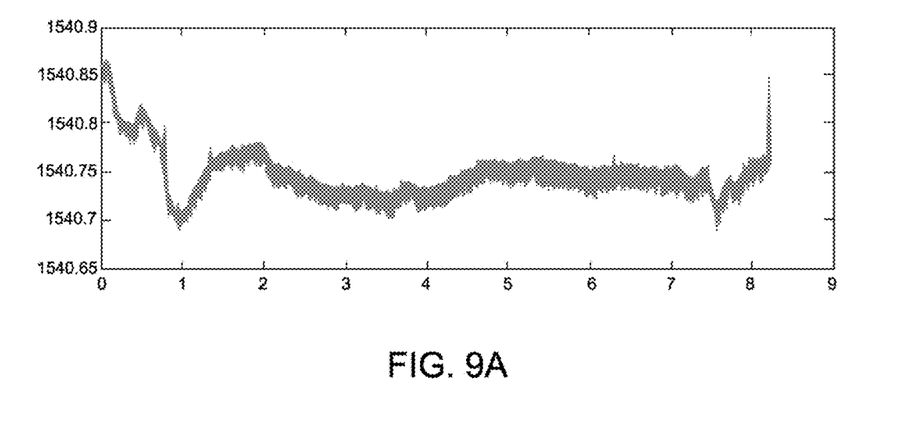
FIG. 9A provides a graph of wavelength over time for a strain sensor having a placement as illustrated in FIG. 8A.
Figure 9B:
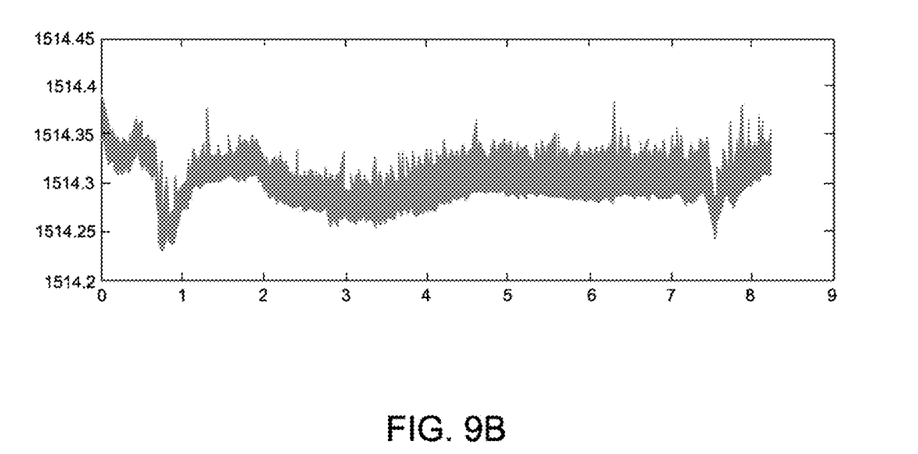
FIG. 9B provides a graph of wavelength over time for a strain sensor having a placement as illustrated in FIG. 8C.

As depicted in FIG. 8A, long strain gauge sensors 25 are fitted along the length of the turnbuckle 22 of the lashing gear 20. These gauges are fitted across the entire length of the turnbuckle 22 in longitudinal direction. The inventors determined however that this configuration is difficult to maintain since the turnbuckle needs to be rotated. Short strain gauge sensors 26 as depicted in FIG. 8C on the other hand are fitted on the lower shackle, after machining the surface. The inventors found that, while measurements are magnified for the long strain gauge sensors 25 as compared to the short strain gauge sensors 26, deviations were accurately captured in both cases. FIGS. 9A and 9B illustrate outputs for the long strain gauge sensors 25 and the short strain gauge sensors 26, respectively. As a result, a preferred implementation uses the short strain gauge sensors 26.

Figure 7A:
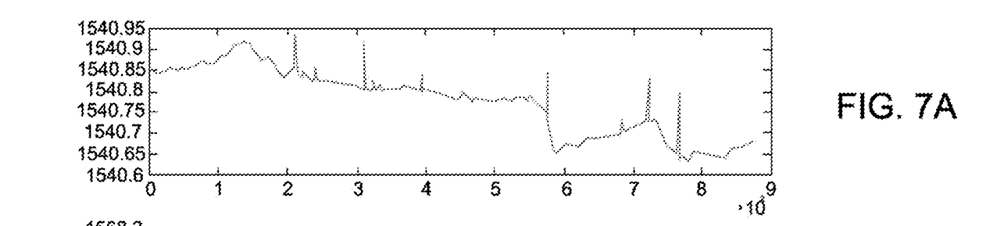
FIG. 7A provides a graph of wavelength over time as measured by a strain sensor, indicating the change in strain over time in accordance with aspects of the present disclosure.
Figure 7B:
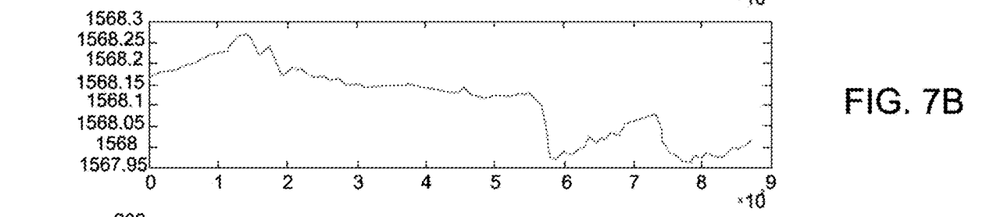
FIG. 7B provides a graph of wavelength over time as measured by a temperature sensor, indicating the change in temperature over time in accordance with aspects of the present disclosure.
Figure 7C:
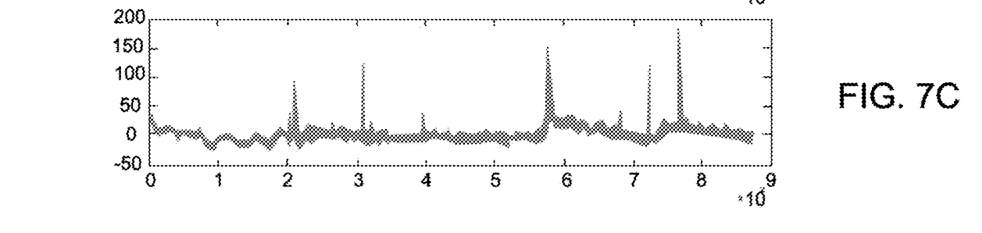
FIG. 7C provides a graph of wavelength over time based on the graphs of FIGS. 7A and 7B, which is compensated to eliminate temperature effects present in the graph of FIG. 7A.

Since the FBG sensors are very sensitive to variation in temperature, an additional sensor is used in each case for measuring temperature. Compensation for temperature is made to accurately measure strain due to movement of ship and other factors. FIGS. 7A-7C illustrate the measurement process. In FIG. 7A, a measure of change in wavelength over time is obtained by the strain gauge. FIG. 7B illustrates the output of an isolated temperature sensor, which indicates a change in wavelength over time due only to temperature effects. In order to produce the output of FIG. 7B, a second FBG sensor may be provided as a temperature sensor in proximity to the strain gauge but isolated from exposure to forces inducing strain. Alternatively, as optical fiber rates of expansion and contraction due to temperature are readily known, the change in wavelength due to temperature can simply be calculated to represent the output of FIG. 7B. As illustrated in FIG. 7C, a difference between the wavelength values illustrated in FIGS. 7A and 7B can then be calculated to determine temperature-compensated strain levels.

Figure 12A:
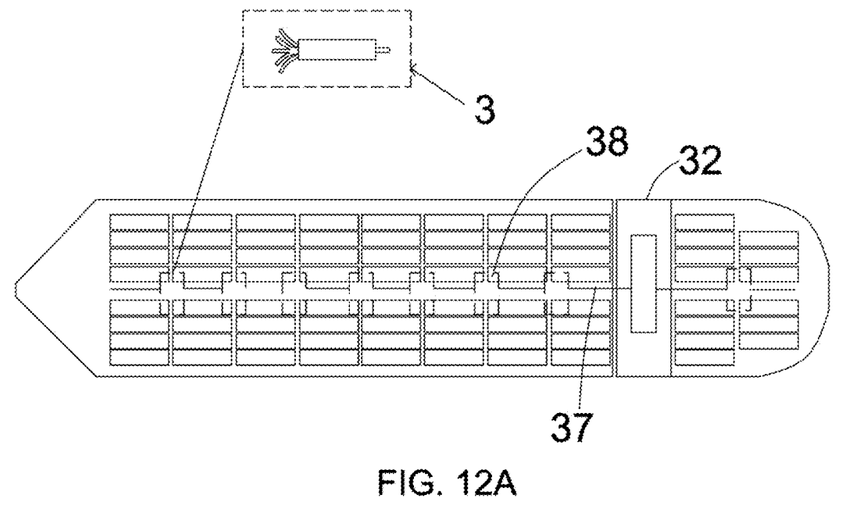
FIG. 12A provides a schematic diagram illustrating an exemplary system architecture for a container lashing gear monitoring system acoording to aspects of the present disclosure.
Figure 12B:
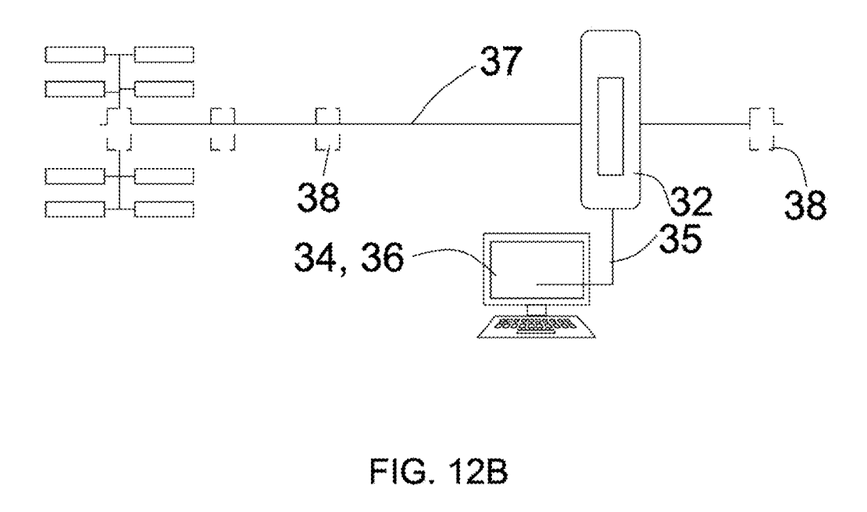
FIG. 12B provides a schematic diagram further illustrating the exemplary system architecture of FIG. 12A.
Figure 13:
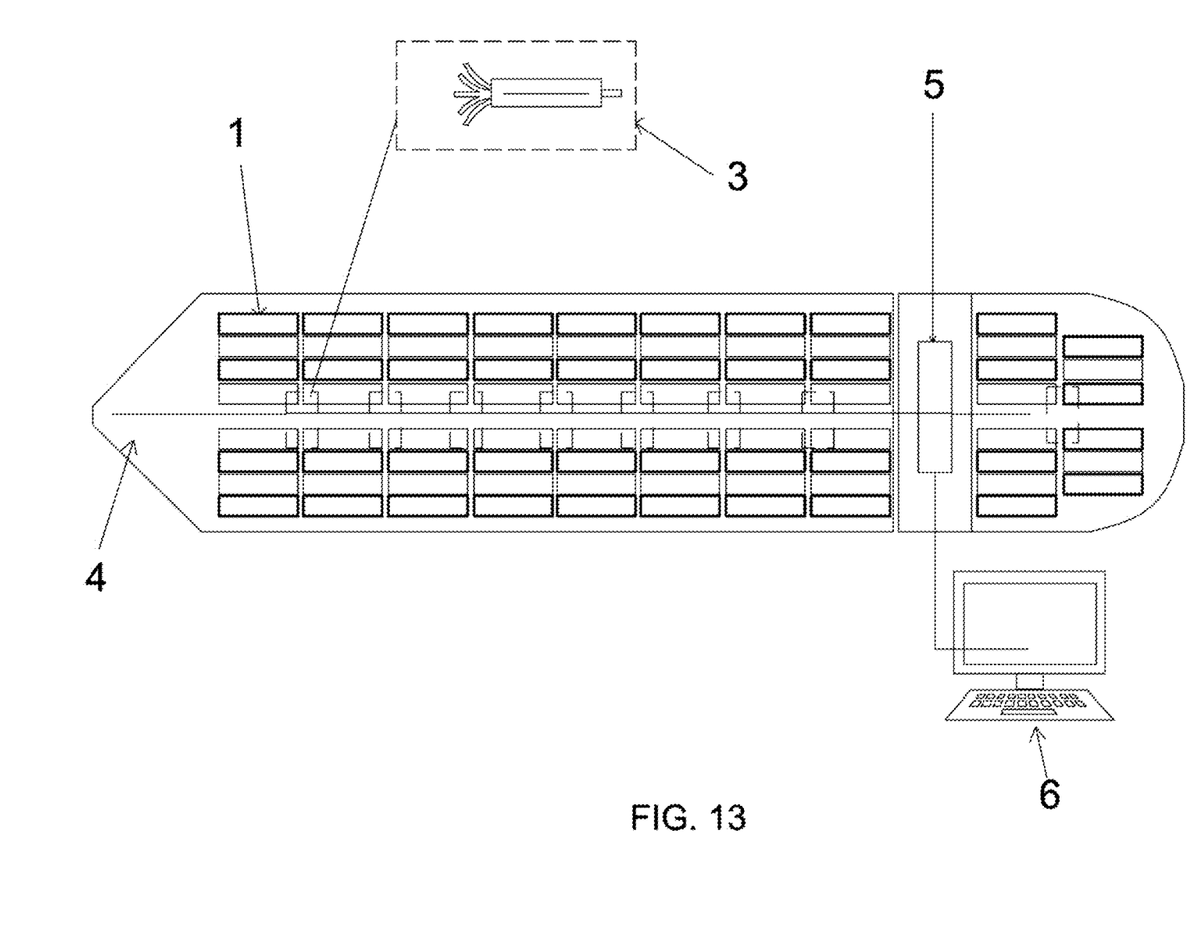
FIG. 13 provides a schematic diagram further illustrating the exemplary system architecture of FIGS. 12A and 12B.

In accordance with aspects of the present disclosure, FIGS. 12A, 12B and 13 illustrate an overall architecture for the container lashing gear monitoring system. Each of the strain gauge sensors 24 and temperatures sensors are coupled via sensor cables 27 and sensor connectors 28 to backbone connectors 38 of an optical fiber backbone 37. Each backbone connector 38 connects sensors from several lashing rods 20 to the optical fiber backbone, which runs across the length of the ship in order to provide access to all containers onboard the ship. Each backbone connector 38 may comprise a number of optical fibersplines each connecting to a sensor.

An interrogator unit 32, which is preferably housed within the ship, determines lashing rod strain from measurements provided by the sensors 24. The interrogator unit 32 is preferably implemented by a Hyperion s255 Hyperion Optical Sensing Instrument, available from Micron Optics, Inc. of Atlanta, Ga. Individual sensors incorporate a light source having a unique wavelength, and thus are able to continuously and identifiably monitor changes in lashing rod tightness for monitored lashing rods 20. Each backbone connector 38 may for example connect up to 16 sensors to optical splines that are integrated with the backbone 37.

As illustrated for example in FIG. 12B, some of the sensors 24 are fixedly attached to the connectors 38, and some are additionally connected to the connectors 38 via one or more free ports 33. Interrogator unit 32 is further coupled (for example, via LAN cable 35) to a general purpose computer 34 and associated display 36 that funtion to provide a continuous monitoring display and alarm unit for the container lashing gear monitoring system.

Figure 11:
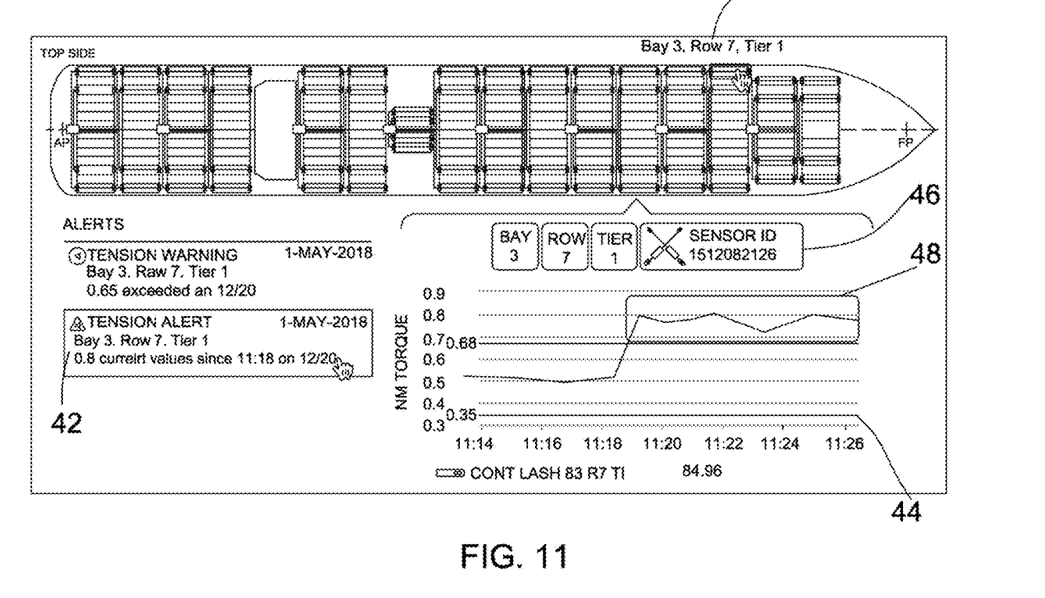
FIG. 11 provides an exemplary dashboard for monitoring lashing gear in accordance with aspects of the present disclosure.

Continuous monitoring display and alarm unit 34, 36 may preferably display a dashboard that is used by operators to identify alert conditions. On this screen, an operator can see a current status of each lashing rod 20 (normal or alarm state), together with strain and historical data. For example, with reference to FIG. 11, the user is able to select a particular sensor 24 (ID No. 1512082126) that is assigned to a lashing rod 20 positioned at bay 3, row 7, tier 1. Graphic 40 depicts the location of the associated container 13 on deck 18 of the vessel 10. Graphic 42 indicates that a "tension warning" was initially issued indicating a tension level that exceeds a baseline value (0.58 nm"), and a "tension alert" was later issued when the exceeded baseline value remained for a predetermined number of measurement and/or time period. One of skill in the art will readily envision many other modes of display are possible for the monitoring and alarm functions. It is possible that Interrogator unit 32 may be coupled to existing on-board monitoring and alert systems for the purpose of implementing the continuous monitoring display and alarm unit 34, 36.

FIG. 13 provides an integrated view of a monitoring and alert system as depicted for example in FIGS. 4B, 12A and 12B. Container stacks 1 that are wither outermost to the filed or subject to the highest loads at sea (shown in bold outline) are selected to be fitted with lashing rods equipped with strain sensors ("SMARTLashing"). The sensors are connected via optical fiber to connectors 3 that integrate with an optical fiber backbone 4 having multiple strands. Optical fiber backbone 4 connects to interrogator unit 5, which is capable to interrogate the individual strands. Each strand may connect multiple sensors, which are distinguishable according to their characteristic wavlengths. Interrogator unit 5 is connected to and controlled by monitoring system 6. The inventors have determined that this system architecture is capable of monitoring up to 1000 sensors.

Figure 6:
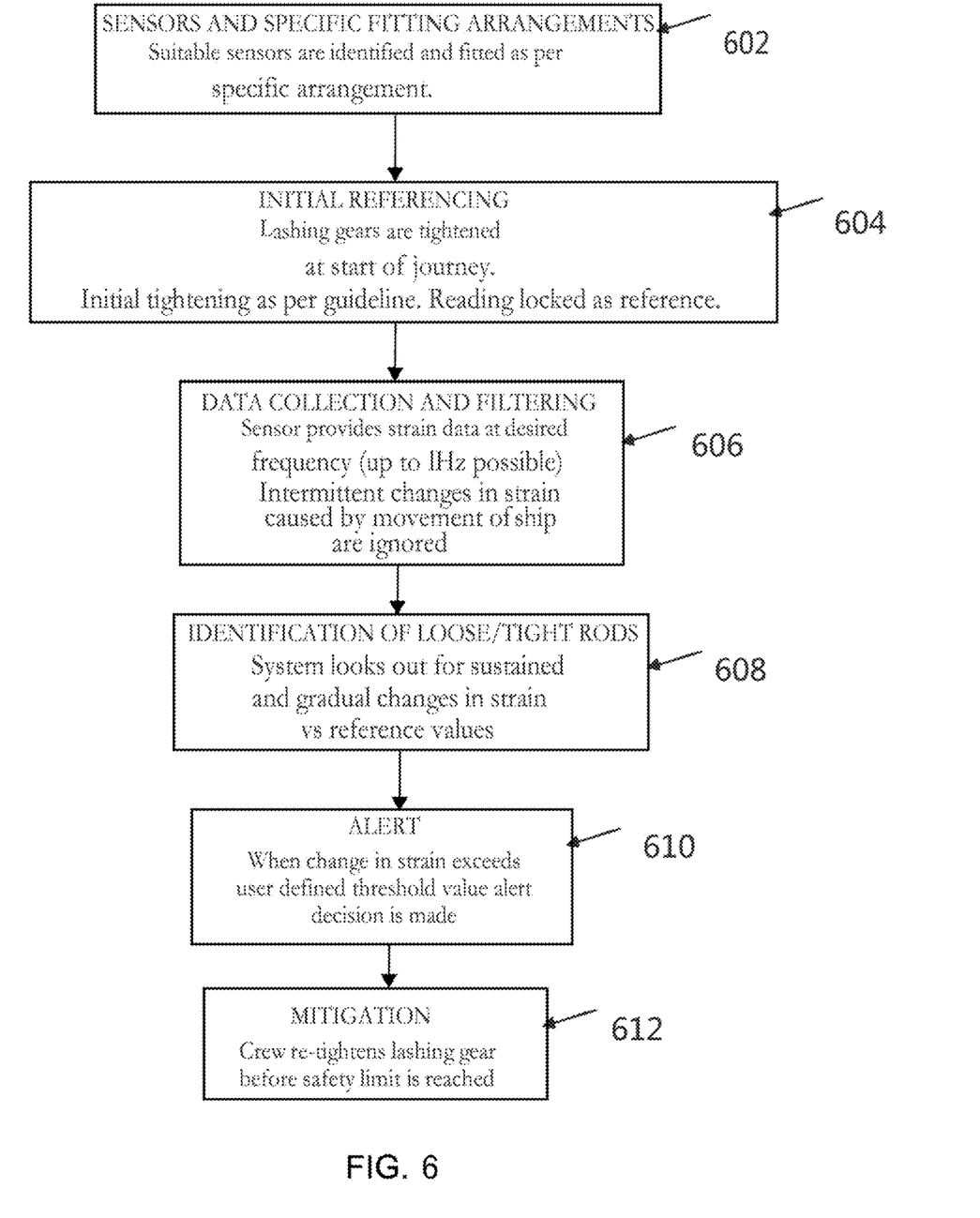
FIG. 6 provides a flow diagram illustrating a process for maintaining a tightness of lashing gear in accordance with aspects of the present disclosure.

FIG. 6 illustrates an exemplary method for operating the container lashing gear monitoring system according to aspects of the present disclosure. At step 602 of the method, sensors 24 are identified and fitted to lashing rods 20 according to a selected design (for example, as depicted in FIG. 4B. At step 604, thelashing gear 20 is tightened according to accepted specifications.[2] At step 606, sensor data is collected from the sensors at regular intervals (for example, with a frequency of 1 Hz), and algorithms are applied to filter increases in strain force that are due only to ship movement. At step 608, additional algorithma are applied to look for sustained and gradual strains that are indicative of a loosening of associated lashing rods 20. At step 610, an alert decision is made when the change and duration of strain exceed a threshold indicating a loosening of associated lashing rods 20. At step 612, upon receipt of the alert, ship crew are dispatched to mitigate the loosening condition by re-tightening the associated lashing gear 20 to prescribed specifications.

[2] See, e.g. "Stowage and Lashing of Containers," Rules for Classification and Construction: Ship Technology, Germanischer Lloyd, Hamburg, Germany, 2013 and "A Master's Guide to Container Securing," 2nd Edition, Lloyd's Register, 2012.

It will be understood that, while various aspects of the present disclosure have been illustrated and described by way of example, the invention claimed herein is not limited thereto, but may be otherwise variously embodied within the scope of the following claims. For example, the system may be readily adapted for application to other mechanical systems both onboard the vessel 10 (including engine rooms) and/oror other operating environments—for example, including tie rods, foundation bolts and other long bolting arrangements subject to cyclic stress and strain.

The following table lists the reference characters and names of features and elements used herein: Reference characters assigned to method steps are not listed.

| Ref. char. | Feature or element |
|---|---|
| 1 | Lashing Rod |
| 3 | Connector |
| 4 | Backbone |
| 5 | Interrogator Unit |
| 6 | Monitoring System |
| 14 | Bay |
| 27 | Cable |
| 16 | Column Stack |
| 34 | Computer |
| 36 | Computer Monitor |
| 28 | Connector - Sensor |
| 38 | Connector |
| 13 | Container |
| 14 | Container Row |
| 14a | Container Row - Outermost on Deck |
| 14b | Container Row - Outermost with Highest Stack Weight |
| 18 | Deck |
| 24 | Fiber Bragg Grating (FBG) Sensor |
| 31 | Fixed Sensor |
| 32 | Interrogator Unit |
| 11 | Lashing Bridge |
| 20 | Lashing Rod |
| 35 | Local Area Network (LAN) cable |
| 30 | Monitoring System |
| 23 | Mounting Plate |
| 37 | Optical Fiber Backbone |
| 33 | Port |
| 27 | Sensor Connector |
| 21 | Shackle |
| 25 | Strain Gauge - Long |
| 26 | Strain Gauge - Short |
| 12 | Tier |
| 21a | Toggle Plate |
| 22 | Turnbuckle |
| 10 | Vessel |

We claim:

1. A system for monitoring a plurality of containers in a container field on a container ship, the plurality of containers restrainedly secured to the container ship by a plurality of restraint members, each restraint members comprising an adjustment member having a turnbuckle member configured for fastening to a fixed point on the vessel via at least one shackle or fork member, the system comprising:
   a plurality of sensors each configured for monitoring one or more of a compressive or tensile stress or strain in one of the plurality of restraint members;
   a controller optically coupled to the plurality of sensors, the controller configured for periodically interrogating each of the plurality of sensors to ascertain a value of stress or strain detected by the respective sensor; and
   a computing device electronically coupled to the controller for monitoring the detected stress and strain values and determining whether the values of stress or strain for one or more of the restraint members satisfies a threshold condition,
   wherein each of the plurality of sensors comprises a Fiber Bragg Grating (FBG) configured for measuring compressive or tensile strain in one of the restraint members and each sensor is configured for attachment to the at least one shackle or fork member of the turnbuckle member of the one restraint member.

2. The system of claim 1, further comprising at least one temperature compensation sensor configured for adjusting stress or strain values detected by at least one of the plurality of sensors.

3. The system of claim 1, wherein the controller is configured to interrogate each sensor at an interval having a frequency of 1 Hertz.

4. The system of claim 1., wherein:
the threshold condition comprises a tensile or compressive strain value in excess of a predetermined baseline value, and
the alert condition is only set when the threshold condition has been satisfied continuously over each of a predetermined number of time-successive interrogations of the respective sensor.

5. The system of claim 4, wherein the respective sensor is interrogated at intervals having a frequency of 1 Hertz.

6. A device for monitoring a restraint member applied to restrainedly secure one of a plurality of containers in a container field on a container ship, the device comprising:
an adjustment member configured to be coupled to the restraint member for adjusting a compressive or tensile force that is applied to the restraint member, the adjustment member having a turnbuckle member comprising at least one shackle or fork member and configured for fastening to a fixed point on the vessel via the at least one shackle or fork member; and
a sensor configured for monitoring one or more of a compressive or tensile stress or strain in the restraint member, wherein the sensor comprises a Fiber Bragg Grating (FBG) configured for measuring strain in the turnbuckle member, the sensor attached to the at least one shackle or fork member of the turnbuckle member.

7. The device of claim 6, further comprising at least one temperature compensation sensor configured for adjusting stress or strain values detected by the sensor.

8. A method for monitoring one or more containers each restrainedly secured in a container field on a container ship, the one or more containers restrainedly secured by one or more restraint members, the one or more restraint members each comprising an adjustment member having a turnbuckle member having at least one shackle or fork member, the at least one shackle or fork member configured for fastening to a fixed point on the vessel, the method comprising the steps of:
providing a plurality of sensors each comprising a Fiber Bragg Grating (FBG) configured for measuring strain in one of the restraint members, each sensor configured for attachment to the shackle or fork member of the turnbuckle member;
configuring a controller optically coupled to the plurality of sensors to periodically interrogate each of the plurality of sensors to ascertain a value of stress or strain detected by the respective sensor; and
configuring a computing device electrically coupled to the controller to monitor the detected stress and strain values and determine whether the values of stress or strain for one or more of the restraint members satisfies a threshold condition.

9. The method of claim 8, further comprising the steps of:
setting an alert condition when the threshold condition has been satisfied for at least one of the respective sensors.

10. The method of claim 8, wherein:
the threshold condition is indicated by a tensile or compressive strain value in excess of a predetermined baseline value, and
the alert condition is only set when the threshold condition has been satisfied continuously over each of a predetermined number of time-successive interrogations of the respective sensor.

11. The method of claim 10, wherein the respective sensor is interrogated at intervals having a frequency of 1 Hertz.

12. The method of claim 8, wherein the one or more containers that are secured by restraint members comprise a subset of containers in the container field.

13. The method of claim 8, wherein:
the containers in the container field are stacked in longitudinally-oriented rows; and
the one or more containers that are secured by restraint members having sensors for monitoring one or more of compressive or tensile stress or strain are positioned one of an outermost row with reference to a container ship longitudinal centerline, and/or in a row having a highest stack weight in the container field.

14. The method of claim 8, wherein the controller is configured to interrogate each sensor at an interval having a frequency of 1 Hertz.

15. The method of claim 8, further comprising the step of providing at least one temperature compensation sensor configured for adjusting stress or strain values detected by at least one of the plurality of sensors.

* * * * *